United States Patent
Watanabe

(10) Patent No.: US 12,322,956 B2
(45) Date of Patent: Jun. 3, 2025

(54) PROTECTION CIRCUIT AND SEMICONDUCTOR DEVICE

(71) Applicants: Kabushiki Kaisha Toshiba, Tokyo (JP); Toshiba Electronic Devices & Storage Corporation, Tokyo (JP)

(72) Inventor: Kentaro Watanabe, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 189 days.

(21) Appl. No.: 18/111,472

(22) Filed: Feb. 17, 2023

(65) Prior Publication Data

US 2024/0106231 A1 Mar. 28, 2024

(30) Foreign Application Priority Data

Sep. 22, 2022 (JP) ................................. 2022-151651

(51) Int. Cl.
*H02H 9/04* (2006.01)
(52) U.S. Cl.
CPC .................................. *H02H 9/046* (2013.01)
(58) Field of Classification Search
CPC ................................................... H02H 9/046
See application file for complete search history.

(56) References Cited

U.S. PATENT DOCUMENTS

| | | | |
|---|---|---|---|
| 6,757,147 B1* | 6/2004 | Tong | H01L 27/0251 361/111 |
| 2005/0168894 A1* | 8/2005 | Gossner | H01L 27/0292 361/56 |
| 2007/0247772 A1 | 10/2007 | Keppens et al. | |
| 2010/0232078 A1* | 9/2010 | Bhattacharya | H01L 27/0266 361/56 |
| 2014/0307354 A1 | 10/2014 | Watanabe | |
| 2014/0368958 A1 | 12/2014 | Ikimura | |
| 2018/0175615 A1* | 6/2018 | Sandhu | H01L 27/0288 |
| 2021/0083471 A1* | 3/2021 | Watanabe | H02H 7/122 |

FOREIGN PATENT DOCUMENTS

| | | |
|---|---|---|
| JP | 2009-534845 A | 9/2009 |
| JP | 5082841 B2 | 9/2012 |
| JP | 2014-207412 A | 10/2014 |
| JP | 2015-002510 A | 1/2015 |

* cited by examiner

*Primary Examiner* — Scott Bauer
(74) *Attorney, Agent, or Firm* — Kim & Stewart LLP

(57) ABSTRACT

In general, according to one embodiment, protection circuit includes first to third power supply lines, a first resistor, a first capacitor, a first transistor, and first to third inverters. The first resistor is coupled between the first power supply line and a first node. The first capacitor is coupled between the first node and the third power supply line. The first inverter includes a first power supply end, a second power supply end, and an input end. The first power supply end of the first inverter is coupled to the second power supply line. The second power supply end of the first inverter is coupled to the third power supply line. The input end of the first inverter is coupled to the first node.

13 Claims, 5 Drawing Sheets

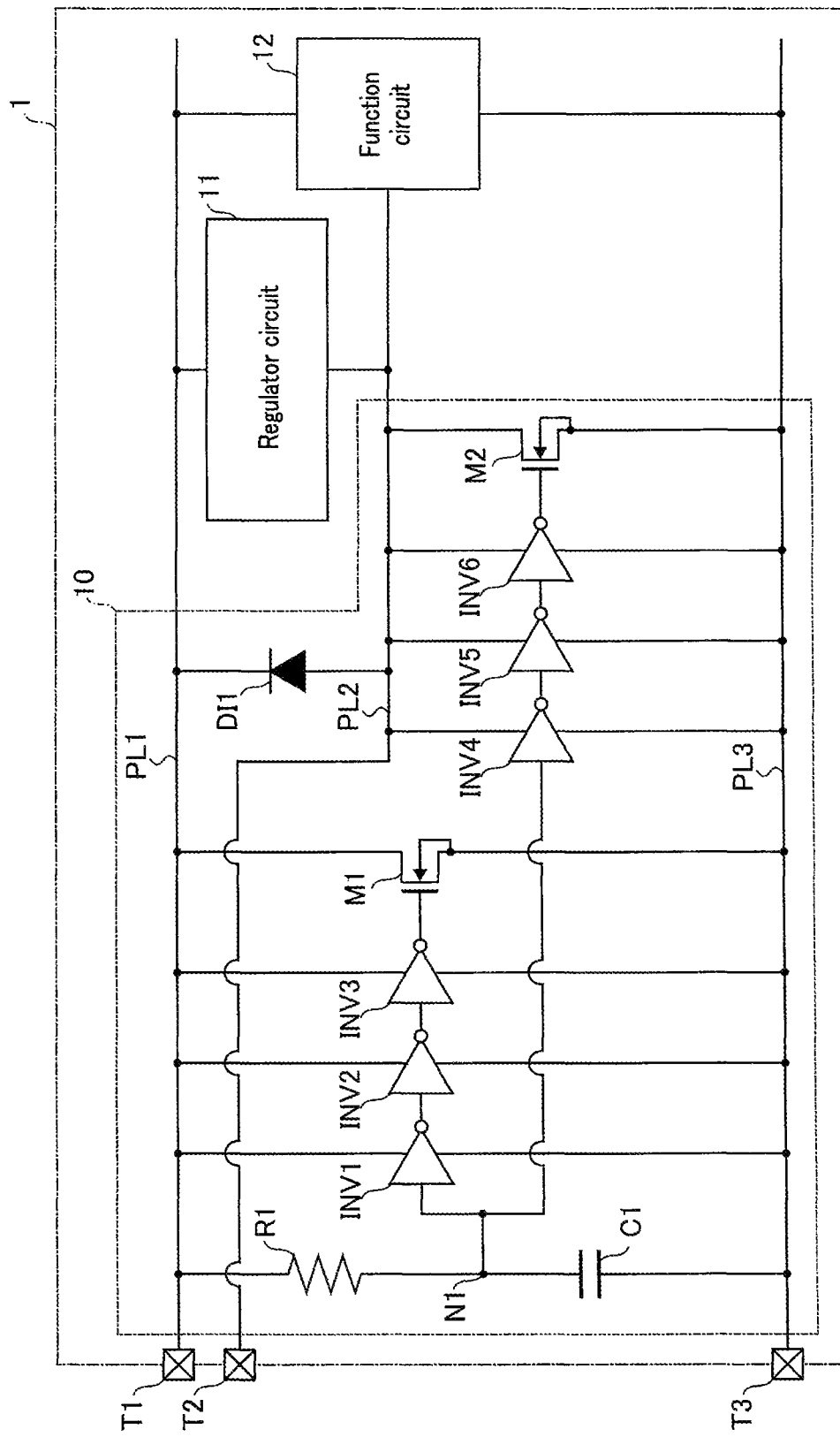
F I G. 1

|  | First state | Second state |
|---|---|---|
| Voltage of power supply line PL1 | 0V | 9 V or lower |
| Voltage of power supply line PL2 | 0V | 3 V or lower |
| Voltage of node N1 | 0V | 0V |
| Logic level of node N1 determined by inverter INV1 | | L |
| Logic level of node N1 determined by inverter INV4 | | L |
| State of transistor M1 | Off | On |
| State of transistor M2 | Off | On |

FIG. 3

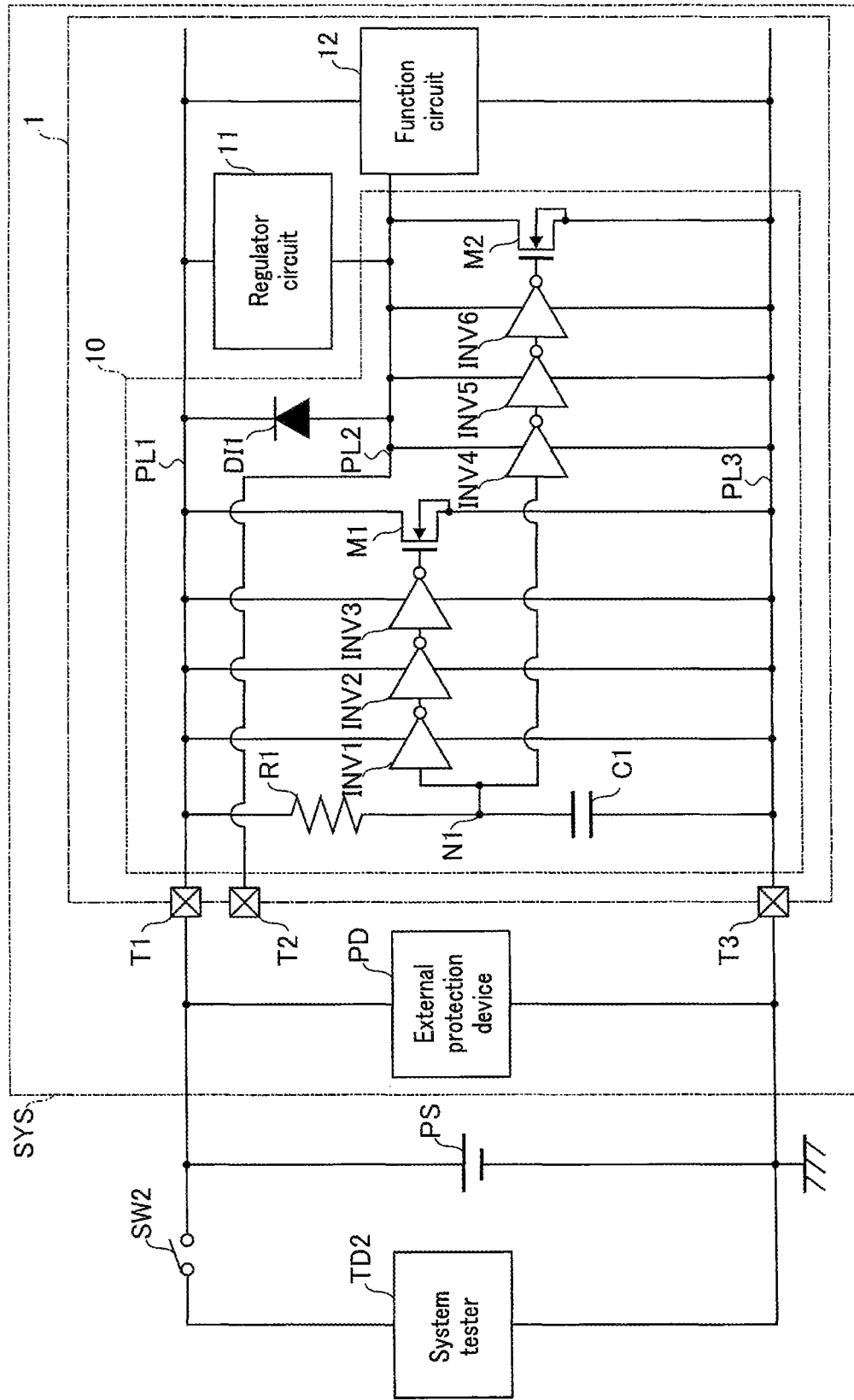
F I G. 4

|  | First state | Second state |
|---|---|---|
| Voltage of power supply line PL1 | 5V | 11V |
| Voltage of power supply line PL2 | 1.5V | 1.5V |
| Voltage of node N1 | 5V | 5V |
| Logic level of node N1 determined by inverter INV1 | H | L |
| Logic level of node N1 determined by inverter INV4 | H | H |
| State of transistor M1 | Off | On |
| State of transistor M2 | Off | Off |

FIG. 5

PROTECTION CIRCUIT AND SEMICONDUCTOR DEVICE

CROSS-REFERENCE TO RELATED APPLICATIONS

This application is based upon and claims the benefit of priority from Japanese Patent Application No. 2022-151651, filed Sep. 22, 2022, the entire contents of which are incorporated herein by reference.

FIELD

Embodiments described herein relate generally to a protection circuit and a semiconductor device.

BACKGROUND

A protection circuit for electrostatic discharge (ESD) is known.

BRIEF DESCRIPTION OF THE DRAWINGS

FIG. 1 is a circuit diagram for explaining a configuration example of a semiconductor device including a protection circuit according to an embodiment.

FIG. 3 is a table for explaining an operation of the protection circuit according to the embodiment in the device test.

FIG. 4 is a circuit diagram for explaining an operation of the semiconductor device including the protection circuit according to the embodiment in a system test.

FIG. 5 is a table for explaining an operation of the protection circuit according to the embodiment in the system test.

DETAILED DESCRIPTION

Figure 2:
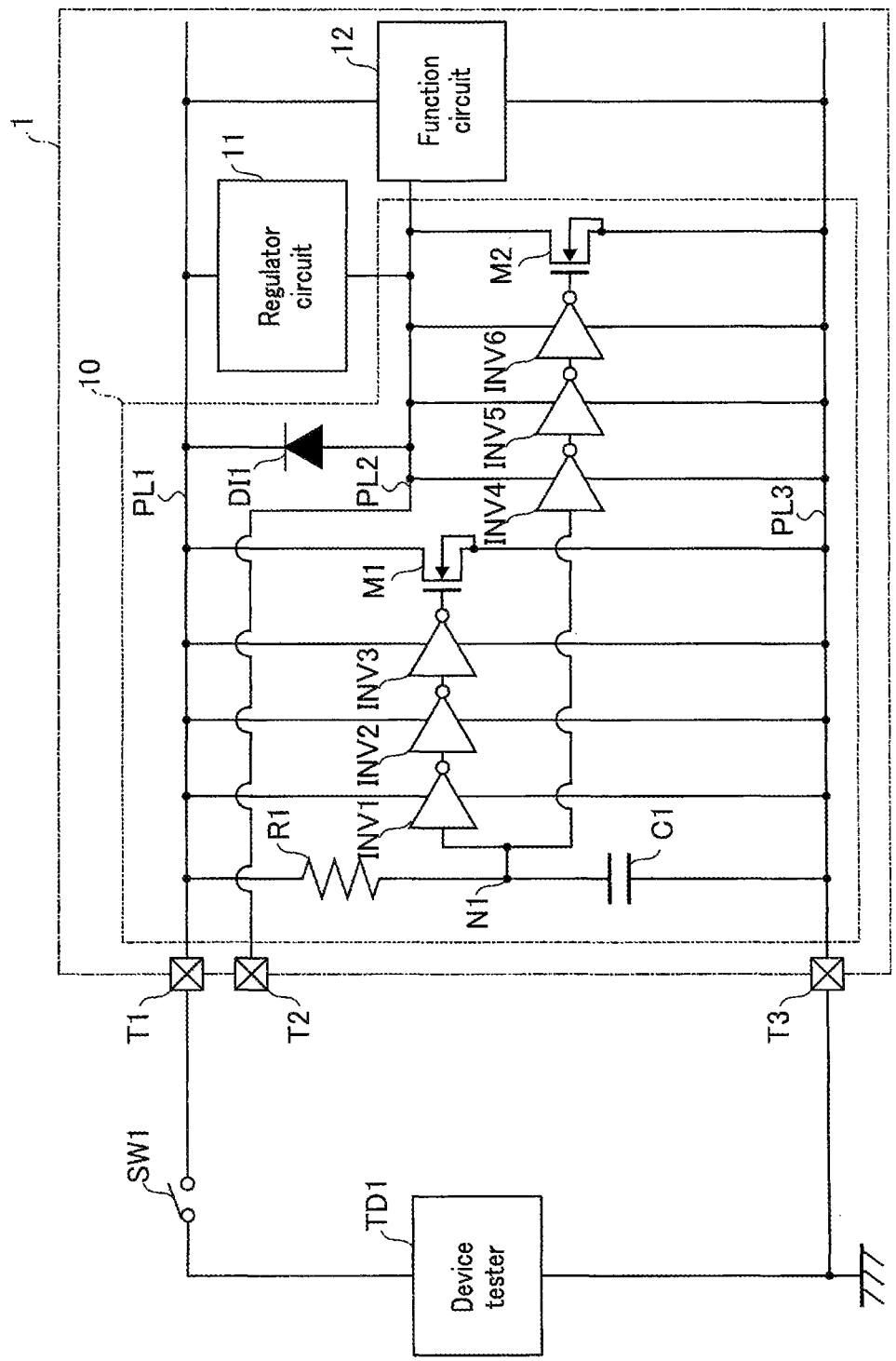
FIG. 2 is a circuit diagram for explaining an operation of the semiconductor device including the protection circuit according to the embodiment in a device test.

In general, according to one embodiment, protection circuit includes a first power supply line, a second power supply line, a third power supply line, a first resistor, a first capacitor, a first transistor, a first inverter, a second inverter, and a third inverter. The first resistor is coupled between the first power supply line and a first node. The first capacitor is coupled between the first node and the third power supply line. The first transistor is coupled between the second power supply line and the third power supply line. The first inverter includes a first power supply end, a second power supply end, and an input end. The first power supply end of the first inverter is coupled to the second power supply line. The second power supply end of the first inverter is coupled to the third power supply line. The input end of the first inverter is coupled to the first node. The second inverter includes a first power supply end, a second power supply end, and an input end. The first power supply end of the second inverter is coupled to the second power supply line. The second power supply end of the second inverter is coupled to the third power supply line. The input end of the second inverter is coupled to an output end of the first inverter. The third inverter includes a first power supply end, a second power supply end, an input end, and an output end. The first power supply end of the third inverter is coupled to the second power supply line. The second power supply end of the third inverter is coupled to the third power supply line. The input end of the third inverter is coupled to an output end of the second inverter. The output end of the third inverter is coupled to a gate of the first transistor.

In the following, an embodiment will be described with reference to the drawings. In the descriptions below, structural elements having approximately the same function and configuration will be denoted by the same reference symbol. The embodiment described below is intended to exemplify the technical ideas. The embodiment is not intended to bind on materials, shapes, structures, arrangements, etc. of the components. The embodiment can be modified in various ways.

Embodiment

A protection circuit according to an embodiment will be described.

(1) Configuration (1-1) Overall Configuration of Semiconductor Device 1

FIG. 1 is a circuit diagram for explaining a configuration example of a semiconductor device 1 including a protection circuit 10 according to the embodiment. The semiconductor device 1 is a device that performs various operations using externally supplied power. The semiconductor device 1 is, for example, an integrated circuit (IC) chip.

The semiconductor device 1 includes power supply lines PL1, PL2, and PL3, terminals T1, T2, and T3, a protection circuit 10, a regulator circuit 11, and a function circuit 12.

Each of the power supply lines PL1, PL2, and PL3 is an interconnect. Each of the power supply lines PL1, PL2, and PL3 is used to supply a power supply voltage to each circuit included in the semiconductor device 1.

Each of the terminals T1, T2, and T3 is a power supply terminal of the semiconductor device 1. The terminal T1 is coupled to the power supply line PL1. The terminal T1 is applied with, for example, a power supply voltage VDDH. The power supply voltage VDDH is, for example, 5 V. The terminal T2 is coupled to the power supply line PL2. For example, a power supply voltage VDDL lower than the power supply voltage VDDH is output from the terminal T2. The power supply voltage VDDL is, for example, 1.5 V. The terminal T3 is coupled to the power supply line PL3. The terminal T3 is grounded to a voltage lower than the power supply voltages VDDH and VDDL (e.g., 0 V), for example.

The protection circuit 10 protects circuits coupled to the power supply lines PL1 and PL2 from ESD. The protection circuit 10 is coupled to the power supply lines PL1, PL2, and PL3.

The regulator circuit 11 generates the power supply voltage VDDL, which is lower than the power supply voltage VDDH, from the power supply voltage VDDH applied to the power supply line PL1, and outputs it to the power supply line PL2. The regulator circuit 11 is coupled to the power supply lines PL1 and PL2.

The function circuit 12 is a circuit that realizes various operations executed by the semiconductor device 1. The function circuit 12 is coupled to the power supply lines PL1, PL2, and PL3.

(1-2) Configuration of Protection Circuit 10

A configuration of the protection circuit 10 will be described still with reference to FIG. 1.

The protection circuit 10 includes a resistor R1, a capacitor C1, inverters INV1 to INV6, transistors M1 and M2, and a diode DI1.

One end of the resistor R1 is coupled to the power supply line PL1. The other end of the resistor R1 is coupled to a node N1. One electrode of the capacitor C1 is coupled to the node N1. The other electrode of the capacitor C1 is coupled to the power supply line PL3.

When the voltage of the power supply line PL1 changes, a change in voltage of the node N1 is delayed by an RC time constant. The RC time constant is determined from a resistance value of the resistor R1 and a capacitance value of the capacitor C1. In the embodiment, the resistance value of the resistor R1 and the capacitance value of the capacitor C1 are set to values that would allow the RC time constant to become sufficiently longer than a time during which an instant electric current flow-in occurs due to the ESD. In other words, while the instant electric current flow-in is caused to occur due to the ESD, the voltage of the node N1 is kept approximately constant.

The inverter INV1 inverts a logic level of the node N1, and outputs it to the inverter INV2. The positive-side power supply end of the inverter INV1 is coupled to the power supply line PL1. The negative-side power supply end of the inverter INV1 is coupled to the power supply line PL3. The inverter INV2 inverts the logic level received from the inverter INV1, and outputs it to the inverter INV3. The positive-side power supply end of the inverter INV2 is coupled to the power supply line PL1. The negative-side power supply end of the inverter INV2 is coupled to the power supply line PL3. The inverter INV3 inverts the logic level received from the inverter INV2, and outputs it to the gate of the transistor M1. The positive-side power supply end of the inverter INV3 is coupled to the power supply line PL1. The negative-side power supply end of the inverter INV3 is coupled to the power supply line PL3.

Each of the inverters INV1 through INV3 is formed by a breakdown voltage transistor capable of operating at the power supply voltage VDDH. Hereafter, a breakdown voltage transistor capable of operating at the power supply voltage VDDH will be referred to as a high breakdown voltage transistor.

The transistor M1 is, for example, an N-type MOSFET. The drain of the transistor M1 is coupled to the power supply line PL1. The source of the transistor M1 is coupled to the power supply line PL3.

The inverter INV4 inverts the logic level of the node N1, and outputs it to the inverter INV5. The positive-side power supply end of the inverter INV4 is coupled to the power supply line PL2. The negative-side power supply end of the inverter INV4 is coupled to the power supply line PL3. The inverter INV5 inverts the logic level received from the inverter INV4, and outputs it to the inverter INV6. The positive-side power supply end of the inverter INV5 is coupled to the power supply line PL2. The negative-side power supply end of the inverter INV5 is coupled to the power supply line PL3. The inverter INV6 inverts the logic level received from the inverter INV5, and outputs it to the gate of the transistor M2. The positive-side power supply end of the inverter INV6 is coupled to the power supply line PL2. The negative-side power supply end of the inverter INV6 is coupled to the power supply line PL3.

The inverter INV4 is formed by a high breakdown voltage transistor. Each of the inverters INV5 and INV6 is formed by a breakdown voltage transistor incapable of operating at the power supply voltage VDDH and capable of operating at the power supply voltage VDDL. Hereinafter, a breakdown voltage transistor incapable of operating at the power supply voltage VDDH and capable of operating at the power supply voltage VDDL will be referred to as a low breakdown voltage transistor. The high breakdown voltage transistor and the low breakdown voltage transistor differ in at least one of gate length and gate oxide film thickness. The high breakdown voltage transistor has a longer gate length, a thicker gate oxide film, or a longer gate length and a thicker gate oxide film than the low breakdown voltage transistor.

The transistor M2 is, for example, an N-type MOSFET. The drain of the transistor M2 is coupled to the power supply line PL2. The source of the transistor M2 is coupled to the power supply line PL3.

The anode of the diode DI' is coupled to the power supply line PL2. The cathode of the diode DI' is coupled to the power supply line PL1.

In the embodiment, each of the inverters INV1 to INV3 and the inverters INV4 to INV6 operates by setting half the voltage of the power supply voltage as a threshold voltage of the logic level. The threshold voltage of the logic level is a voltage that is used as a threshold value when determining whether the logic level of the node is an "H" level or an "L" level. For example, in the case where the power supply voltage is 5 V, the threshold voltage of the logic level becomes 2.5 V, 3 V is determined to be an "H" level, and 2 V is determined to be an "L" level. Further, in a case where the power supply voltage increases, the threshold voltage of the logic level also increases. For example, in a case where the power supply voltage is 10 V, the threshold voltage of the logic level is 5 V. In this specification, in a state where the power supply voltage is approximately 0 V, or in a state where the power supply voltage is low and the circuit does not operate normally, the logic level will not be set.

(2) Operation

The protection circuit 10 according to the embodiment performs different operations depending on conditions. In this specification, the operations of the protection circuit 10 will be described using two conditions as examples: a device test and a system test. The device test and the system test are tests for applying ESD to a test object by using a test device. The device test uses a single device as the test object. The system test uses a system that is operating with a power supply voltage applied as the test object. Hereinafter, the ESD applied in the device test will be referred to as device ESD, and the ESD applied in the system test will be referred to as system ESD.

(2-1) Operation of Protection Circuit 10 in Device Test

First, with reference to FIGS. 2 and 3, the operation of the protection circuit 10 according to the embodiment in the device test will be described. FIG. 2 is a circuit diagram for explaining an operation of the semiconductor device including the protection circuit according to the embodiment in the device test. FIG. 3 is a table for explaining the operation of the protection circuit according to the embodiment in the device test. As shown in FIG. 2, one end of a device tester TD1 is coupled to the terminal T1 via a switch SW1. The other end of the device tester TD1 is coupled to the terminal T3 and is grounded. The device tester TD1 can apply the device ESD to a device that is coupled to the device tester TD1.

In the device test, the device tester TD1 applies the device ESD to the semiconductor device 1. The device test is, for example, a human body model (HBM) test, a machine model (MM) test, and a charged device model (CDM) test. A description will be given in order of a first state, which is a state before the device tester TD1 applies the device ESD to the semiconductor device 1, and a second state, which is a state in which the device ESD is being applied.

(First State: State Before Device ESD is Applied)

In the first state, the switch SW1 decouples the device tester TD1 from the terminal T1. The power supply voltage is not supplied to the semiconductor device 1, and the semiconductor device 1 is sufficiently discharged. The voltage of the power supply line PL1 is 0 V. The voltage of the power supply line PL2 is 0 V. Since the capacitor C1 is sufficiently discharged, the voltage of the node N1 is 0 V. Each of the logic level of the node N1 determined by the inverter INV1 and the logic level of the node N1 determined by the inverter INV4 is not defined since the inverters INV1 to INV6 are not operated. Since the power supply voltage is not supplied, the transistors M1 and M2 are in an off state.

(Second State: State in which Device ESD is being Applied)

In the second state, the switch SW1 couples the device tester TD1 to the terminal T1. The device tester TD1 applies a current of the device ESD to the terminal T1. Since the current is input via the terminal T1, the voltage of the power supply line PL1 rises. In the second state, the voltage of the power supply line PL1 is controlled to be not higher than a clamp voltage on a high voltage side (e.g., 9 V) by the function of this ESD protection circuit. The clamp voltage on the high voltage side is set to a level that does not destroy a high-voltage operation circuit of the function circuit 12.

The voltage of the power supply line PL1 has increased due to the ESD, but the operation of the regulator circuit 11 is indeterminate because this is not a normal power supply sequence. The voltage of the power supply line PL2 is also controlled to be not higher than a clamp voltage on a low voltage side (e.g., 3 V) by the function of this ESD protection circuit. The clamp voltage on the low voltage side is set to a level that does not destroy a low-voltage operation circuit of the function circuit 12.

The RC time constant determined from the resistance value of the resistor R1 and the capacitance value of the capacitor C1 is sufficiently larger than a time required for the power supply voltage to be boosted by a fast surge current such as ESD, so the voltage of the node N1 remains 0 V during ESD surge application. The threshold voltage of the logic level of the inverter INV1 is about ½ of the clamp voltage of the power supply line PL1 during ESD application. Thus, the inverter INV1 determines the voltage of 0 V at the node N1 to be an "L" level. The threshold voltage of the logic level of the inverter INV4 is about ½ of the clamp voltage of the power supply line PL2 during ESD application. Thus, the inverter INV4 determines the voltage of 0 V at the node N1 to be an "L" level.

The inverter INV1 outputs an "H" level to the inverter INV2. The inverter INV2 inverts the received "H" level, and outputs an "L" level to the inverter INV3. The inverter INV3 inverts the received "L" level, and outputs an "H" level to the gate of the transistor M1. Since the "H" level is applied to the gate, the transistor M1 is turned on. Through the on-state transistor M1, the power supply line PL1 is discharged.

The inverter INV4 outputs an "H" level to the inverter INV5. The inverter INV5 inverts the received "H" level, and outputs an "L" level to the inverter INV6. The inverter INV6 inverts the received "L" level, and outputs an "H" level to the gate of the transistor M2. Since the "H" level is applied to the gate, the transistor M2 is turned on. Through the on-state transistor M2, the power supply line PL2 is discharged.

In this way, when the device ESD is applied to the semiconductor device 1, the transistors M1 and M2 turn on and the protection circuit 10 can protect the function circuit 12 from the high voltage.

(2-2) Operation of Protection Circuit 10 in System Test

Now, with reference to FIGS. 4 and 5, the operation of the protection circuit 10 according to the embodiment in the system test will be described. FIG. 4 is a circuit diagram for explaining an operation of the semiconductor device including the protection circuit according to the embodiment in the system test. FIG. 5 is a table for explaining the operation of the protection circuit according to the embodiment in the system test.

As shown in FIG. 4, a system SYS includes the semiconductor device 1 and an external protection device PD. The external protection device PD is turned on when a voltage difference between two ends exceeds a threshold voltage Vpd and functions as a current path to protect the semiconductor device 1 from a high voltage caused by ESD at the system level. The threshold voltage Vpd is, for example, 12 V. One end of the external protection device PD is coupled to the terminal T1. The other end of the external protection device PD is coupled to the terminal T3.

A positive-side output of a power supply PS is coupled to the terminal T1. A negative-side output of the power supply PS is coupled to the terminal T3 and is grounded. The power supply PS supplies the power supply voltage VDDH to the system SYS. The power supply voltage VDDH is 5 V. One end of a system tester TD2 is coupled to the terminal T1 via a switch SW2. The other end of the system tester TD2 is coupled to the terminal T3. The system tester TD2 is capable of applying the system ESD to a system that is coupled to the system tester TD2.

In the system test, the system tester TD2 applies the system ESD to the system SYS to which the power supply voltage is supplied. The system test is, for example, a test that is specified by IEC61000-4-2. A description will be given in order of a first state, which is a state before the system tester TD2 applies the system ESD, and a second state, which is a state in which the system tester TD2 is applying the system ESD.

(First State: State Before System ESD is Applied)

In the first state, the switch SW2 decouples the device tester TD2 from the terminal T1. The system SYS is operating with the power supply voltage VDDH of 5 V supplied from the power supply PS. The voltage of the power supply line PL1 is 5 V.

The regulator circuit 11 generates 1.5 V, which is the power supply voltage VDDL, from the voltage of 5 V of the power supply line PL1, and outputs it to the power supply line PL2. The voltage of the power supply line PL2 is 1.5 V.

The capacitor C1 is charged with 5 V of the power supply line PL1 through the resistor R1. Thus, the voltage of the node N1 is 5 V. The threshold voltage of the logic level of the inverter INV1 is 2.5 V, which is half the voltage of 5 V of the power supply line PL1. Thus, the inverter INV1 determines the voltage of 5 V at the node N1 to be an "H" level. The threshold voltage of the logic level of the inverter INV4 is 0.75 V, which is half the voltage 1.5 V of the power supply line PL2. Thus, the inverter INV4 determines the voltage of 5 V at the node N1 to be an "H" level.

The inverter INV1 outputs an "L" level to the inverter INV2. The inverter INV2 inverts the received "L" level, and outputs an "H" level to the inverter INV3. The inverter INV3 inverts the received "H" level, and outputs an "L" level to the gate of the transistor M1. Since the "L" level is applied to the gate, the transistor M1 is turned off.

The inverter INV4 outputs an "L" level to the inverter INV5. The inverter INV5 inverts the received "L" level, and outputs an "H" level to the inverter INV6. The inverter INV6 inverts the received "H" level, and outputs an "L" level to the gate of the transistor M2. Since the "L" level is applied to the gate, the transistor M2 is turned off.

In this manner, in the first state where the system tester TD2 is decoupled, the system SYS operates by using the power supply voltage VDDH of 5 V. In the first state, the transistors M1 and M2 are in the off state.

(Second State: State in which System ESD is being Applied)

In the second state, the switch SW2 couples the device tester TD2 to the terminal T1. The device tester TD2 applies a current of the system ESD to the terminal T1. Since the current is input via the terminal T1, the voltage of the power supply line PL1 rises. In the second state, a state in which the voltage of the power supply line PL1 has risen to 11 V will be described.

The output voltage of the regulator circuit 11 does not change even if the voltage of the power supply line PL1 rises. The regulator circuit 11 outputs a voltage of 1.5 V to the power supply line PL2. The voltage of the power supply line PL2 is 1.5 V.

The RC time constant determined from the resistance value of the resistor R1 and the capacitance value of the capacitor C1 is sufficiently larger than a time required for the power supply voltage to be boosted by a fast surge current such as system ESD. Thus, during ESD surge application, the voltage of the node N1 remains 5 V, which is the voltage before the surge application. The threshold voltage of the logic level of the inverter INV1 is 5.5 V, which is half the voltage of 11 V of the power supply line PL1. Thus, the inverter INV1 determines the voltage of 5 V at the node N1 to be an "L" level. The threshold voltage of the logic level of the inverter INV4 is 0.75 V, which is half the voltage of 1.5 V of the power supply line PL2. Thus, the inverter INV4 determines the voltage of 5 V at the node N1 to be an "H" level.

The inverter INV1 outputs an "H" level to the inverter INV2. The inverter INV2 inverts the received "H" level, and outputs an "L" level to the inverter INV3. The inverter INV3 inverts the received "L" level, and outputs an "H" level to the gate of the transistor M1. Since the "H" level is applied to the gate, the transistor M1 is turned on. Through the on-state transistor M1, the power supply line PL1 is discharged.

The inverter INV4 outputs an "L" level to the inverter INV5. The inverter INV5 inverts the received "L" level, and outputs an "H" level to the inverter INV6. The inverter INV6 inverts the received "H" level, and outputs an "L" level to the gate of the transistor M2. Since the "L" level is applied to the gate, the transistor M2 is turned off.

In this way, when the system ESD is applied to the system SYS and the voltage of the power supply line PL1 rises to 11 V, which is larger than twice the power supply voltage VDDH of 5 V, the transistor M1 is turned on and the transistor M2 remains off.

If more time elapses from the second state, the voltage of the power supply line PL1 rises to 12 V, and the external protection device PD is turned on. The external protection device PD, which has been turned on, protects the semiconductor device 1 from the high voltage caused by the system ESD.

(3) Advantageous Effect

With the protection circuit 10 according to the embodiment described above, operational reliability can be improved. A detailed advantageous effect of the protection circuit 10 according to the embodiment will be described below.

In a semiconductor device, an ESD may be applied both in a state of a stand-alone device and in a state in which the device is embedded in a system. Therefore, in order to protect the device from the device ESD, a protection circuit is provided inside the device. Further, in order to protect the system from the system ESD, the system is provided with an external protection device separately from the protection circuit inside the device. The protection circuit inside the device preferably does not operate when the system ESD is applied.

In the protection circuit 10 according to the embodiment, the inverters INV4 to INV6, which control the transistor M2, are coupled to the power supply line PL2 and operate using the power supply voltage VDDL. The power supply voltage VDDL is a voltage generated by the regulator circuit 11. Thus, even if the system ESD is applied and the voltage of the power supply line PL1 rises, the power supply voltage VDDL does not rise. Therefore, in the inverter INV4 operating using the power supply voltage VDDL, the threshold voltage of the logic level would not be increased by the system ESD.

As a result, in the protection circuit 10 according to the embodiment, in the case where the system ESD is applied, the inverter INV4 can determine the node N1 to be an "H" level without being affected by the voltage rise of the power supply line PL1. Thus, in the case where the system ESD is applied, the protection circuit 10 according to the embodiment can keep the transistor M2 off. The transistor M2 maintains the off state, which suppresses fluctuations in the power supply voltage VDDL and improves operational reliability.

(4) Modification, etc.

In the embodiment, the case in which the terminal T2 coupled to the power supply line PL2 is provided is described as an example, but the terminal T2 may be omitted.

In this specification, the term "couple" refers to electrical coupling, and does not exclude interposition of another component. In addition, "electrical coupling" may be performed via an insulator, if the same operation is ensured thereby. The term "on state" refers to a state in which the gate of a relevant transistor is applied with a voltage equal to or higher than a threshold voltage of that transistor. The term "off state" refers to a state in which the gate of a relevant transistor is applied with a voltage below a threshold voltage of that transistor, and does not exclude, for example, a state in which a minute current such as a leakage current of the transistor flows.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A protection circuit comprising:
a first power supply line;
a second power supply line;
a third power supply line;

a first resistor coupled between the first power supply line and a first node;
a first capacitor coupled between the first node and the third power supply line;
a first transistor coupled between the second power supply line and the third power supply line;
a first inverter including a first power supply end coupled to the second power supply line, a second power supply end coupled to the third power supply line, and an input end coupled to the first node;
a second inverter including a first power supply end coupled to the second power supply line, a second power supply end coupled to the third power supply line, and an input end coupled to an output end of the first inverter; and
a third inverter including a first power supply end coupled to the second power supply line, a second power supply end coupled to the third power supply line, an input end coupled to an output end of the second inverter, and an output end coupled to a gate of the first transistor.

2. The protection circuit according to claim 1, wherein
a first voltage is applied to the first power supply line,
a second voltage lower than the first voltage is applied to the second power supply line, and
a third voltage lower than the first voltage and the second voltage is applied to the third power supply line.

3. The protection circuit according to claim 1, further comprising:
a second transistor coupled between the first power supply line and the third power supply line;
a fourth inverter including a first power supply end coupled to the first power supply line, a second power supply end coupled to the third power supply line, and an input end coupled to the first node;
a fifth inverter including a first power supply end coupled to the first power supply line, a second power supply end coupled to the third power supply line, and an input end coupled to an output end of the fourth inverter; and
a sixth inverter including a first power supply end coupled to the first power supply line, a second power supply end coupled to the third power supply line, an input end coupled to an output end of the fifth inverter, and an output end coupled to a gate of the second transistor.

4. The protection circuit according to claim 1, wherein a thickness of a gate oxide film of a transistor included in the first inverter is thicker than a thickness of a gate oxide film of a transistor included in the second inverter.

5. The protection circuit according to claim 1, wherein a gate length of a transistor included in the first inverter is longer than a gate length of a transistor included in the second inverter.

6. The protection circuit according to claim 1, further comprising a diode including an anode coupled to the second power supply line and a cathode coupled to the first power supply line.

7. The protection circuit according to claim 2, wherein
in a first state where the first voltage is applied to the first power supply line, the first transistor is in an off state, and
after the first state, in a second state where a fourth voltage larger than twice the first voltage is applied to the first power supply line, the first transistor maintains the off state.

8. A semiconductor device comprising:
a protection circuit; and
a regulator circuit,
the protection circuit including:
a first power supply line;
a second power supply line;
a third power supply line;
a first resistor coupled between the first power supply line and a first node;
a first capacitor coupled between the first node and the third power supply line;
a first transistor coupled between the second power supply line and the third power supply line;
a first inverter including a first power supply end coupled to the second power supply line, a second power supply end coupled to the third power supply line, and an input end coupled to the first node;
a second inverter including a first power supply end coupled to the second power supply line, a second power supply end coupled to the third power supply line, and an input end coupled to an output end of the first inverter; and
a third inverter including a first power supply end coupled to the second power supply line, a second power supply end coupled to the third power supply line, an input end coupled to an output end of the second inverter, and an output end coupled to a gate of the first transistor;
wherein, in the protection circuit,
a first voltage is applied to the first power supply line,
a second voltage lower than the first voltage is applied to the second power supply line, and
a third voltage lower than the first voltage and the second voltage is applied to the third power supply line,
the regulator circuit being coupled to the first power supply line and the second power supply line and configured to output the second voltage to the second power supply line.

9. The semiconductor device according to claim 8, wherein the protection circuit further includes:
a second transistor coupled between the first power supply line and the third power supply line;
a fourth inverter including a first power supply end coupled to the first power supply line, a second power supply end coupled to the third power supply line, and an input end coupled to the first node;
a fifth inverter including a first power supply end coupled to the first power supply line, a second power supply end coupled to the third power supply line, and an input end coupled to an output end of the fourth inverter; and
a sixth inverter including a first power supply end coupled to the first power supply line, a second power supply end coupled to the third power supply line, an input end coupled to an output end of the fifth inverter, and an output end coupled to a gate of the second transistor.

10. The semiconductor device according to claim 8, wherein a thickness of a gate oxide film of a transistor included in the first inverter is thicker than a thickness of a gate oxide film of a transistor included in the second inverter.

11. The semiconductor device according to claim 8, wherein a gate length of a transistor included in the first inverter is longer than a gate length of a transistor included in the second inverter.

12. The semiconductor device according to claim 8, wherein the protection circuit further includes a diode including an anode coupled to the second power supply line and a cathode coupled to the first power supply line.

13. The semiconductor device according to claim 8, wherein in a first state where the first voltage is applied to the first power supply line, the first transistor is in an off state, and after the first state, in a second state where a fourth voltage larger than twice the first voltage is applied to the first power supply line, the first transistor maintains the off state.

* * * * *